UNITED STATES PATENT OFFICE.

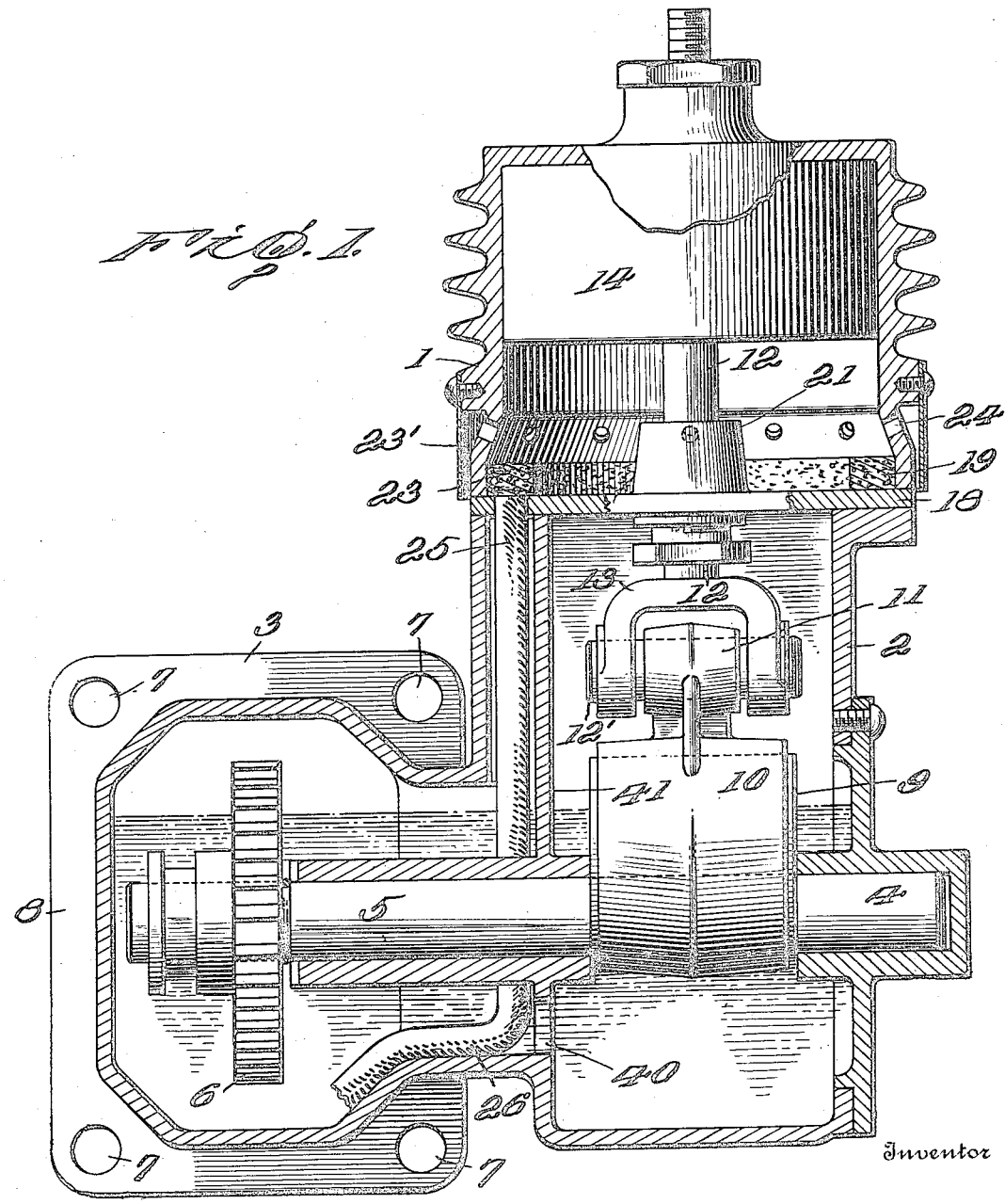

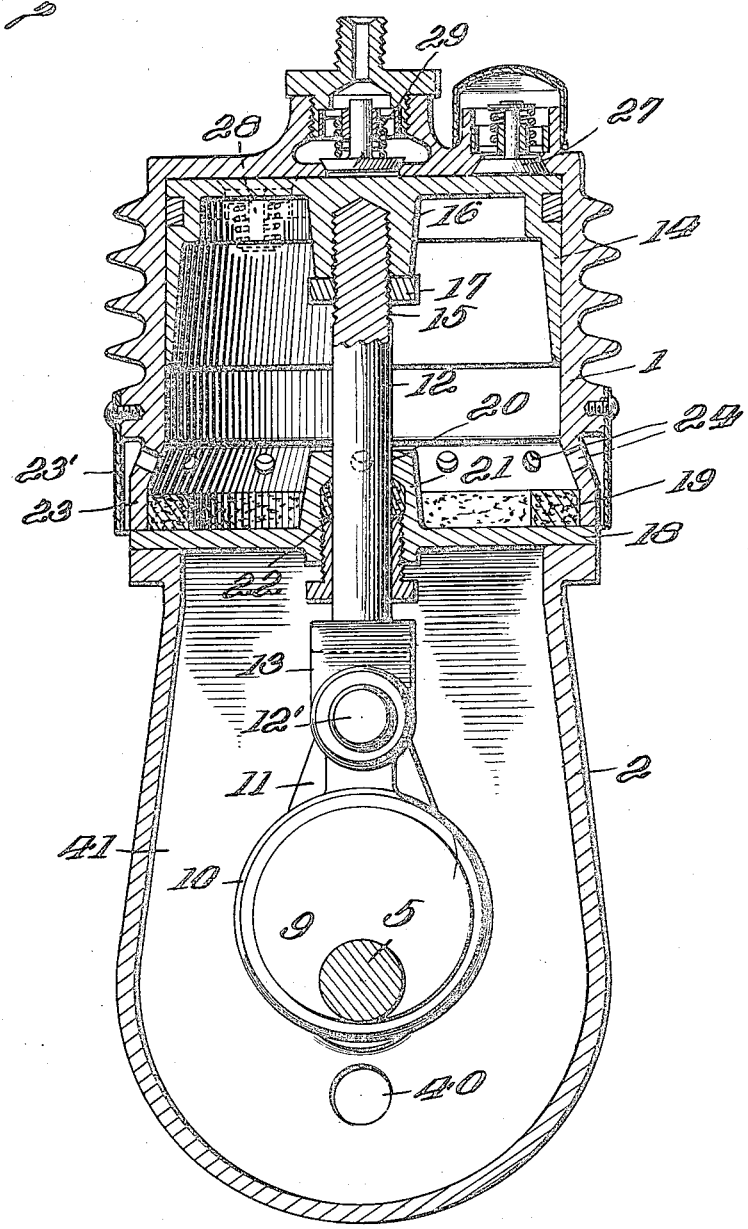

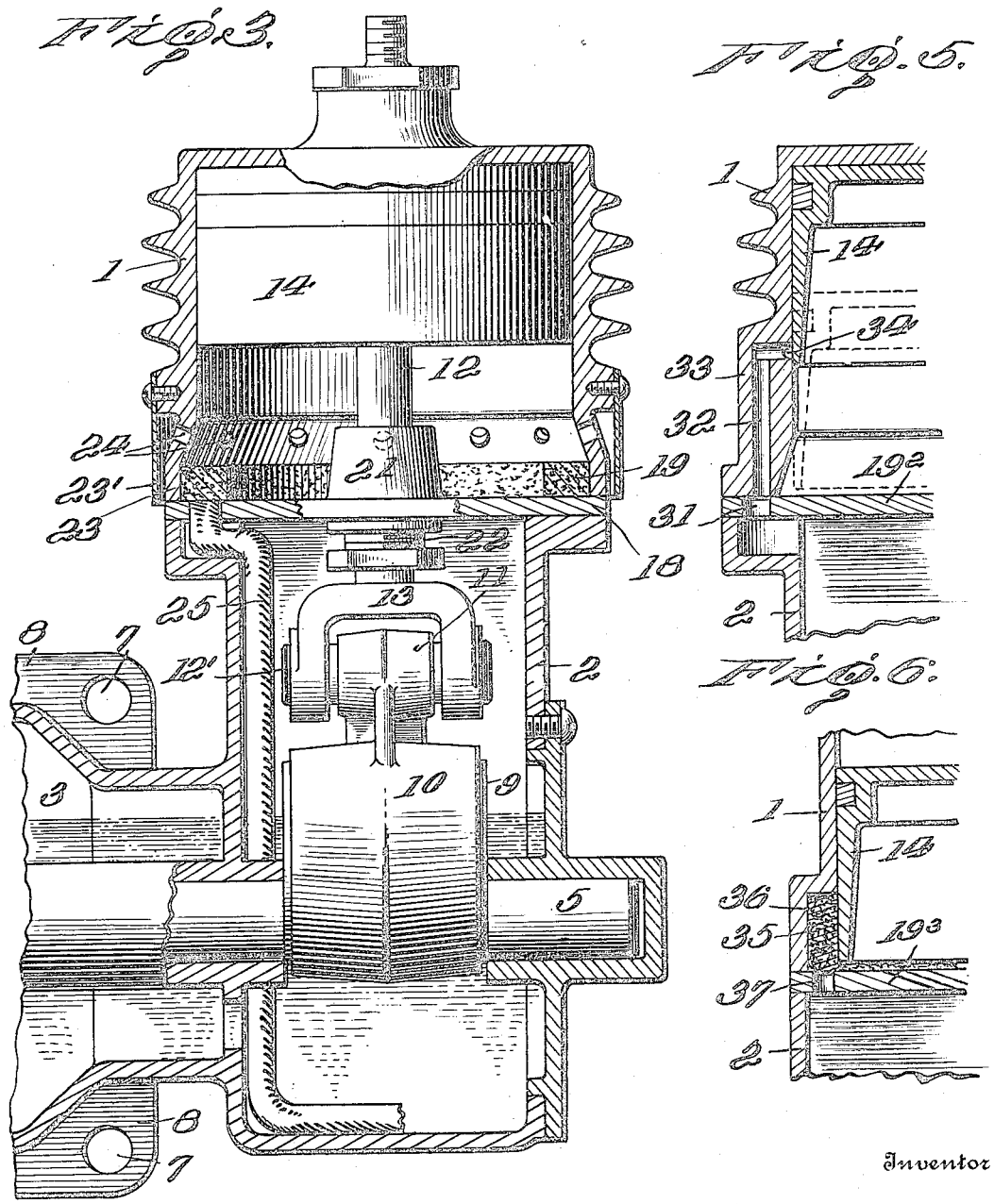

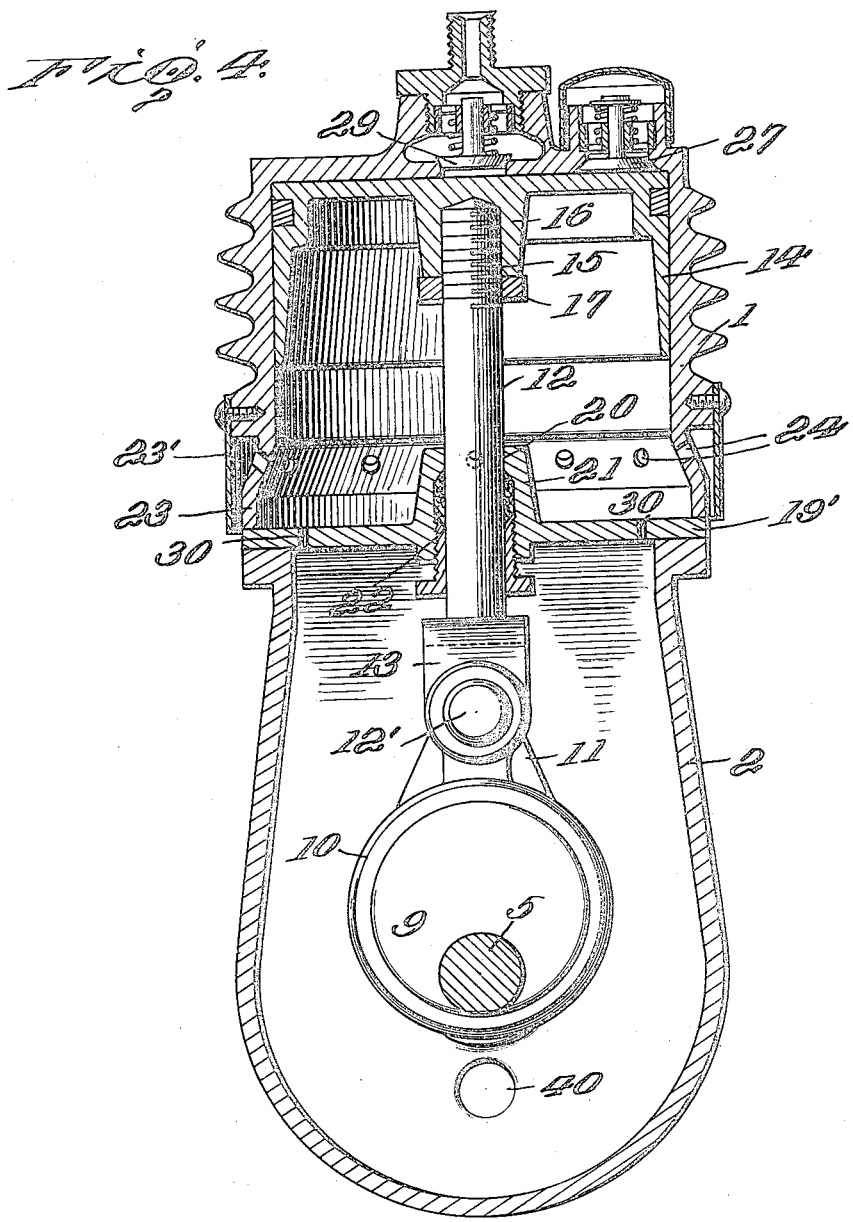

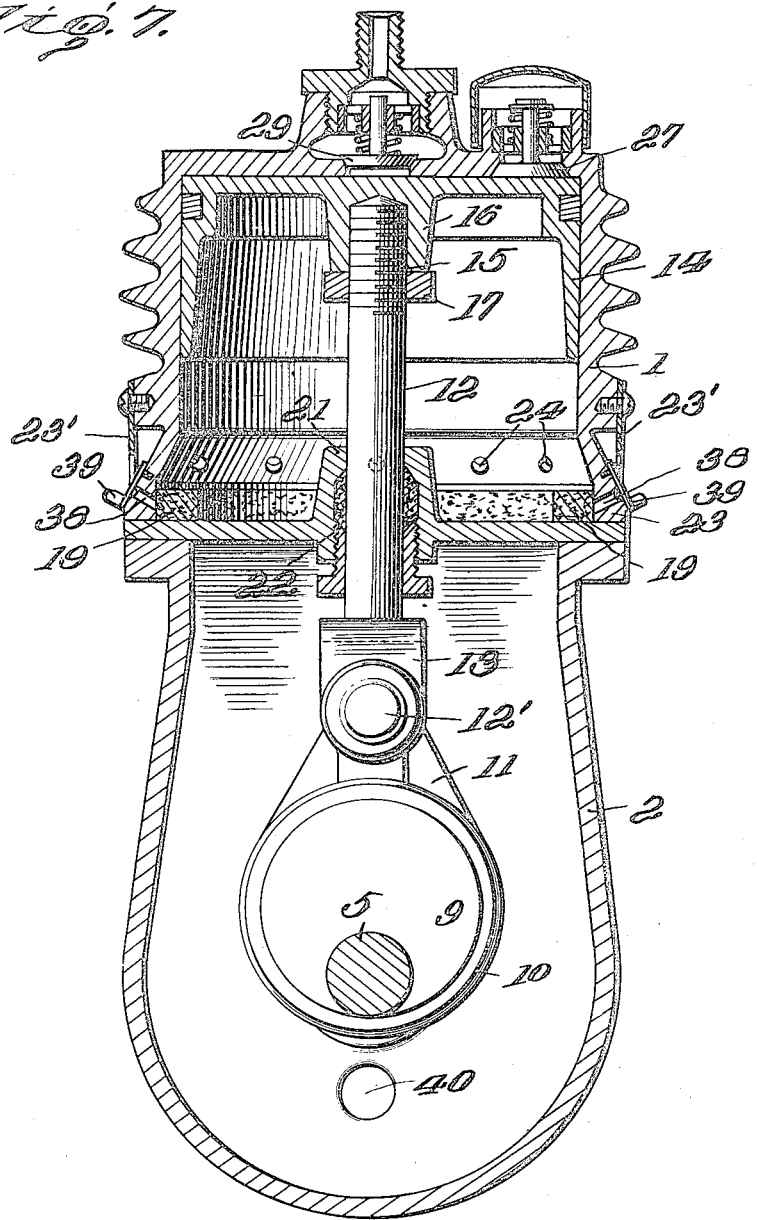

GEORGE EDGAR HAZARD, OF ROCHESTER, NEW YORK, ASSIGNOR TO KELLOGG MANUFACTURING CO., OF ROCHESTER, NEW YORK.

AUTOMOBILE-DRIVEN TIRE-PUMP.

1,323,053.            Specification of Letters Patent.       Patented Nov. 25, 1919.

Application filed June 17, 1919. Serial No. 304,745.

*To all whom it may concern:*

Be it known that I, GEORGE E. HAZARD, a citizen of the United States, residing at Rochester, in the county of Monroe and State of New York, have invented certain new and useful Improvements in Automobile-Driven Tire-Pumps, of which the following is a specification, reference being had therein to the accompanying drawing.

This invention relates to improvements in automobile driven tire pumps, and pertains to a pump which is adapted to be operatively connected with the transmission, or other suitable gear mechanism of the automobile to be driven thereby.

The present improvement pertains more particularly to a construction that is to be attached to the automobile transmission case and driven by the transmission gear.

It is well-known that oil has a rapid deteriorating effect upon rubber, and one of the problems of an automobile driven tire pump is to provide efficient lubrication for all of the movable parts, including the piston and cylinder, and at the same time prevent surplus lubrication reaching the lower end of the pump cylinder in excess quantity and thereby working its way into the compression chamber of the pump and mingling with the compressed air that is forced into the tire.

The primary object of my present invention is to provide a construction of tire pump which provides ample and efficient lubrication for all of the movable parts of the pump, including its cylinder and piston, and at the same time prevent excess lubrication reaching the lower end of the cylinder and finally working its way into the compression chamber and mingling with the air compressed therein.

In the accompanying drawings:

Figure 1 is a vertical sectional view of a tire pump embodying my present improvement, taken longitudinally of the drive shaft of the pump.

Fig. 2 is a vertical sectional view taken at right angles to Fig. 1.

Fig. 3 is a vertical sectional view taken longitudinally of the pump drive shaft and showing a slight modification in construction from that shown in Figs. 1 and 2.

Fig. 4 is a vertical sectional view taken transverse the pump drive shaft and showing a still further modification, and yet embodying my generic improvement.

Fig. 5 is a longitudinal sectional view taken through one side of the cylinder and piston and upper end of the eccentric or crank case, showing a still further modification of my present generic improvement.

Fig. 6 is a sectional view through the lower end of the cylinder, the piston and the upper end of the crank or eccentric case, showing another modification of my present improvement.

Fig. 7 is a vertical sectional view of a tire pump embodying my present improvement, taken at right angles to the drive shaft of the pump and illustrating another modification of my present improvement.

Referring now to the drawings, and Figs. 1 and 2 particularly, 1 is the cylinder of my pump; 2 the eccentric or crank case upon which the cylinder is mounted and 3 a gear case. A drive shaft 4 is suitably journaled within the case 2 and has its end 5 extending into the gear case 3, and carries a suitable gear 6 to be driven by the automobile mechanism. In the form here shown, the gear case 3 is adapted to be attached to the automobile transmission case, not shown, by means of bolts, not shown, passing through openings 7 of a flange 8, projecting from the gear case 3. As here shown, the gear case 3 is made integral with the eccentric case 2, but this is not essential to the carrying out of my present improvement. In fact, the gear case 3 may be entirely separate from the eccentric case 2, and may be separated a short distance from the case 2, without departing from my invention. In this latter instance, of course, the gear case 3 would be provided with a wall at that end adjacent the eccentric case 2, and may or may not be in communication therewith. An eccentric 9 is carried by the shaft 5, and surrounding the eccentric 9, is an eccentric strap 10. This strap 10 is provided with an upwardly extending lug 11, through which a wrist pin 12' passes, and the pin 12' also passes through the bifurcated lower end 13 of a piston rod 12. While I here show and prefer to use an eccentric for reciprocating the piston rod 12, I desire it to be understood that the shaft 5 may be provided with a crank connection with the piston rod 12. The upper end of the piston rod 12 is connected with the piston 14, in any suitable manner. The form of connection here shown is by providing the upper end of the rod 12 with screw threads 15, which enter an internally screw-threaded lug 16, depending from the piston 14, and a lock-nut 17, between the lug and the rod 12.

My present improvement involves providing a division wall 18 between the cylinder 1 and the case 2, so that the lower end of the cylinder is closed from the case 2 and prevents any splash of the oil or lubricant from the eccentric or crank case 2 reaching the cylinder. This construction enables ample lubrication to be provided for the movable parts within the cases 2 and 3, and yet prevent it from reaching the cylinder 1, and thereby cause excessive lubrication within the cylinder, which would finally reach the compression chamber of the pump and be forced into the tire with its deteriorating effect on the rubber of the tire.

In the construction shown in Figs. 1 and 2, the piston 14 is oiled from a suitable pad 19, which is superimposed on the division wall between the cylinder 1 and the case 2. This division wall is preferably made of a separate member that is clamped between the upper end of the case 2 and the lower end of the cylinder 1, and it is provided with a central opening 20, through which the rod 12 reciprocates. In this instance, the opening is formed through a boss 21, preferably integral with the divisional wall 18, and it is, as here shown, in the well-known form of a stuffing box 22, to make a tight joint around the piston rod 12. The piston in its lowest position will just touch the pad 19 and in that way obtain efficient lubrication, but prevent an excessive lubrication. As shown, the lower end of the cylinder has an enlarged portion 23, and this is provided with a suitable number and sizes of openings 24, for the ingress and egress of air as the piston reciprocates.

The pad 19 may receive its lubricant in various ways without departing from my invention. The way shown in Figs. 1 and 2 is by a suitable wick 25, extending through the division wall 18 to the pad, and its lower end 26 extending into the lubricant of the gear case 3.

The pump may either take in air through a valve 27 in the head of the cylinder, or may take air through a valve in the head of the piston, as shown in dotted lines 28. In either case air is forced from the pump by a suitable check valve 29.

Fig. 3 is the same construction as that shown in Fig. 1, except that the wick 25 has its lower end within the eccentric case 2, and receiving lubrication therefrom to be conveyed to the pad 19, instead of from the gear case as in Fig. 1. Otherwise the construction and operation is the same and the description of Fig. 1 otherwise applies to Fig. 3.

Fig. 4 shows a modification of that previously described in that the lubricating pad is omitted and in the place thereof, the division wall 19' between the case 2 and the cylinder 1, is provided with one or more openings 30, which will permit a very limited amount of oil to be splashed through them on to the wall 19', which by capillary action will travel up the wall of the cylinder to the required point for lubricating the piston. In other respects the construction and operation is the same as that of the previous construction here shown.

In Fig. 5 a further modification is shown, in that the division wall $19^2$ is provided with one or more openings 31, which will communicate with one or more passages 32 extending through a boss, or bosses 33, formed on the lower end of the cylinder, the upper end 34 of the passage 32 communicating with the cylinder, so that it will lubricate the piston, as shown in that figure of the drawing. In that form oil will reach the opening 31 by a splash and capillary action from the eccentric case 2, and travel by capillary action through the passage 32 to the outlet 34.

In Fig. 6 another modification of the lubricating means is shown, in that a pad 35 is located in an opening 36 formed in the wall of the cylinder 1, and oil will pass from the eccentric case 2, through the opening 37, in the division wall $19^3$ to the pad 35.

Fig. 7 shows a further modification involving the invention in that the lubricating pad 19 will be supplied with oil through an opening, or openings, 38, made in the enlarged lower end 23 of the cylinder 1. In this instance, there will be a suitable movable cap 39 for each of the openings 38.

It will be observed from the foregoing description and its disclosure, that in each case there is a division wall at the lower end of the cylinder, which separates it from the eccentric case 2, and that the piston rod 12, passes through this division wall and connects the piston with the eccentric or crank of the shaft 5, as the case may be.

Wherever the term "eccentric case" is used in the claims, it is to be understood as comprehending a crank case, because mechanically an eccentric and a crank are equivalents for the purpose of reciprocating the piston rod. In fact, the eccentric may be mechanically regarded as one form of a crank.

In the construction here shown, lubrication will flow from the automobile transmission case, not shown, into the case 3 of the pump, and from there into the eccentric case 2, through a suitable opening 40, where a wall 41 is interposed. However, the gear case and eccentric case may be closed against communication and each separately provided with its lubricant, without affecting my present improvement.

It will be understood, of course, that in the structure shown in Figs. 5 and 6, the lower end of the cylinder will be provided with a suitable opening, or openings, (not shown).

Having thus described my invention, what I claim and desire to secure by Letters Patent is:

1. An improved automobile tire pump structure, comprising a case containing a lubricant, a cylinder mounted thereon, a piston within the cylinder, a wall at the lower end of the cylinder and separating it from the case to prevent lubrication passing from the said case to the cylinder, an operating shaft in the case, a piston rod passing through the wall and connecting the piston and the operating shaft, the piston receiving a limited amount of lubrication at a point above the said wall, thereby preventing an excessive lubrication reaching the cylinder, for the purpose described.

2. An improved automobile tire pump structure, comprising an eccentric case containing a lubricant, a cylinder mounted thereon, a separating wall between the lower end of the cylinder and the case, an operating shaft in the case, a piston in the cylinder, a piston rod passing through the wall and connecting the piston and the operating shaft, the said wall having a passage through which oil passes to the top of the wall in limited quantities to lubricate the piston, thereby providing efficient lubrication for the movable parts within the case and a limited lubrication for the piston, for the purpose described.

3. An improved automobile tire pump structure, comprising an eccentric case containing a lubricant, a cylinder mounted thereon, a separating wall between the lower end of the cylinder and the top of the case, a piston in the cylinder, an operating shaft in the case, a piston rod connected with the piston and passing through an opening in the wall which prevents lateral movement of the piston rod, the lower end of the piston rod operatively connected with the operating shaft to reciprocate the piston, and a limited supply of lubricant at a point above the separating wall for lubricating the piston.

4. An improved automobile tire pump structure, comprising an eccentric case containing a lubricant, a cylinder mounted thereon, a separating wall between the lower end of the cylinder and at the top of the case, a piston in the cylinder, an operating shaft in the case, a separating wall having a piston rod bearing opening, and a piston rod passing through the said opening and operatively connecting the piston and operating shaft.

5. An improved automobile tire pump structure, comprising a case containing a lubricant, a cylinder mounted on the case, a separating wall between the bottom of the cylinder and the top of the case, an operating shaft in the case, the separating wall having a piston rod stuffing box bearing passing therethrough, a piston rod operatively connecting the piston and the operating shaft, and means supplying a limited quantity of lubricant at a point above the separating wall for lubricating the piston, for the purpose described.

6. An improved automobile tire pump structure, comprising a case containing a lubricant, a cylinder mounted thereon, a separating wall between the cylinder and the case, a lubricating pad on top of the separating wall, means for supplying a lubricant to the pad, an operating shaft in the case, a piston in the cylinder, a separating wall having a piston rod opening, a piston rod passing therethrough and fitting the opening, and a piston rod operatively connecting the piston and the operating shaft, whereby the movable parts in the case are amply lubricated and a limited supply of lubrication above the wall for the piston, substantially as and for the purpose described.

7. An improved automobile tire pump structure, comprising a case carrying a lubricant, a cylinder having an enlarged lower end mounted on the case, a separating wall between the enlarged lower end of the cylinder and the upper end of the case, an operating shaft in the case, a piston in the cylinder, a piston rod passing through the separating wall and operatively connecting the piston and the operating shaft, and a lubricant within the enlarged lower end of the cylinder for lubricating the piston.

8. An improved automobile tire pump structure, comprising a case containing a lubricant, a cylinder mounted thereon, a separating wall between the lower end of the cylinder and the upper end of the case, an operating shaft in the case, a piston in the cylinder, a piston rod passing through the separating wall and operatively connecting the piston and the operating shaft, means for lubricating the piston at a point above the separating wall, the lower end of the cylinder provided with an air opening, the parts combined for the purpose described.

In testimony whereof I hereunto affix my signature.

GEORGE EDGAR HAZARD.

DISCLAIMER.

1,323,053.—*George Edgar Hazard*, Rochester, N. Y. AUTOMOBILE-DRIVEN TIRE
PUMP. Patent dated November 25, 1919. Disclaimer filed June 22, 1923, by
the patentee and the assignee, *Kellogg Manufacturing Co.*

Hereby enter this disclaimer to said claim of the specification of said Letters Patent, which claim is as follows:

"4. An improved automobile tire pump structure, comprising an eccentric case containing a lubricant, a cylinder mounted thereon, a separating wall between the lower end of the cylinder and at the top of the case, a piston in the cylinder, an operating shaft in the case, a separating wall having a piston rod bearing opening, and a piston rod passing through the said opening and operatively connecting the piston and operating shaft."

[*Official Gazette July 10, 1923.*]